United States Patent
Joy et al.

[15] 3,680,375
[45] Aug. 1, 1972

[54] SONIC VELOCITY SENSING

[72] Inventors: Robert D. Joy; Russell F. Colton, both of Cedar Rapids, Iowa

[73] Assignee: J-Tec Associates, Incorporated, Cedar Rapids, Iowa

[22] Filed: Sept. 12, 1969

[21] Appl. No.: 857,328

[52] U.S. Cl. .............................................73/194 B
[51] Int. Cl. ..............................................G01p 5/00
[58] Field of Search........................73/194, 24, 67.7

[56] References Cited

UNITED STATES PATENTS

| | | | |
|---|---|---|---|
| 3,214,728 | 10/1965 | Higgins | 340/21 |
| 2,813,424 | 11/1957 | Liepmann et al. | 73/194 |
| 3,116,639 | 1/1964 | Bird | 73/194 |
| 3,209,591 | 10/1965 | Lester et al. | 73/194 |

FOREIGN PATENTS OR APPLICATIONS

| | | | |
|---|---|---|---|
| 150,656 | 12/1963 | U.S.S.R. | 73/194 |
| 925,541 | 5/1963 | Great Britain | 73/194 |

*Primary Examiner*—Richard C. Queisser
*Assistant Examiner*—Herbert Goldstein
*Attorney*—Griffin, Branigan and Kindness

[57] ABSTRACT

This disclosure describes a method and apparatus for determining the relative velocity between an object and a fluid stream. A vortex strut attached to the object is located in the fluid stream so as to generate Karman vortices at a frequency proportional to the relative velocity between the object and the stream. In one embodiment, a sonic signal transmitting transducer is located on one side of the strut's wake and a sonic signal receiving transducer is located on the other side of the wake. The transmitting transducer's signal is modulated by the Karman vortices and received by the receiving transducer. An electronic detecting system is connected to the signal receiving transducer for detecting the modulations created by the Karman vortices. An alternate embodiment of the invention combines the sonic signal transmitting transducer and the sonic signal receiving transducer in a single transducer structure. The combined transducer structure is mounted in the strut. A burst of pulses is transmitted and reflected by a Karman vortex back to the combined transducer structure where the reflected signal is detected.

28 Claims, 13 Drawing Figures

PATENTED AUG 1 1972 3,680,375
SHEET 1 OF 5
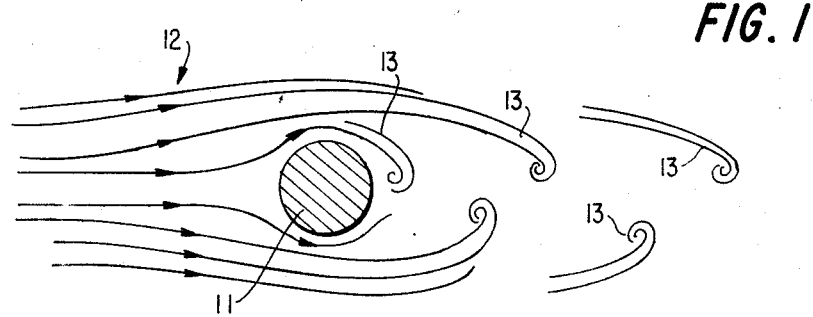
FIG. 1
FIG. 4
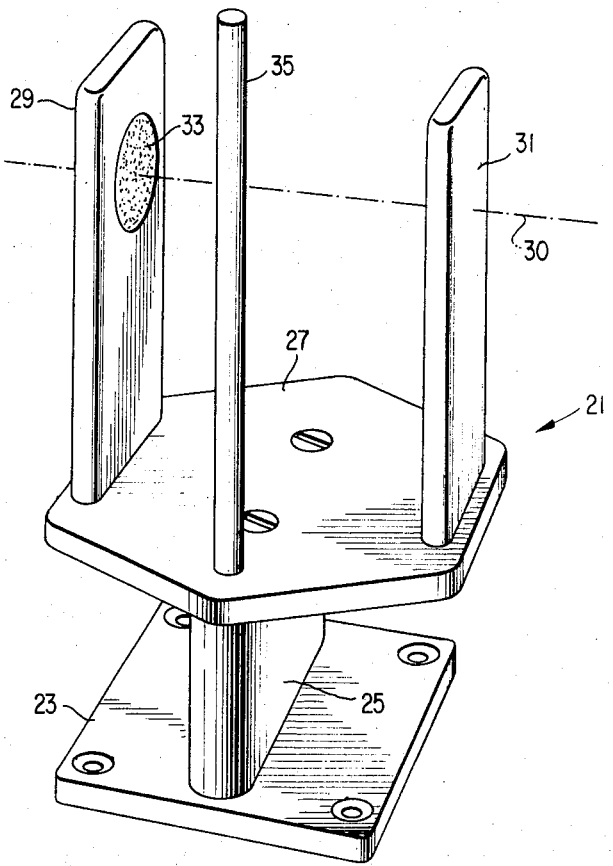
INVENTORS
ROBERT D. JOY
RUSSELL F. COLTON
BY Griffin, Branigan and Kindness
ATTORNEYS

INVENTORS
ROBERT D. JOY
RUSSELL F. COLTON

BY *Griffin, Branigan and Kindness*

ATTORNEYS

INVENTORS
ROBERT D. JOY
RUSSELL F. COLTON
BY Griffin, Branigan and Kindness
ATTORNEYS

SONIC VELOCITY SENSING

BACKGROUND OF THE INVENTION

Various types of well known devices determine the relative velocity between a fluid and a body or object immersed in the fluid. The body may be moving and the fluid relatively stationary such as occurs when an aircraft passes through a windless atmosphere, for example. Alternatively, the body may be a stationary buoy located in a current of water. One common type of relative velocity measuring device often used on aircraft senses the pressure difference between static air and dynamic air by the use of a pitot-static head. The instrument shows true air speed under standard sea-level conditions (29.92 inches of mercury at 15° C). However, in actual practice, reading corrections must almost always be applied because standard, sea-level conditions occur infrequently. Hence, this type of instrument is often difficult to use.

Alternate to a pitot-static head assembly, a venturi tube or its equivalent may be utilized in an air speed measuring device. In this type of device, pressure differentials are measured along the length of the venturi tube to obtain pressure differences which can be utilized to provide an indication of air speed. However, the venturi tube has the same disadvantages as the pitot-static head, i.e., the velocity differential is a function of the fluid density.

A further alternate method of measuring relative velocity is by utilizing instruments to measure the apparent increase or decrease in acoustic velocity caused by the fluid velocity either adding to or subtracting from the propogation velocity. Variations of this type of system include those that utilize the reflection of acoustic or electromagnetic energy from discontinuities in the fluid from bubbles, turbulence, etc. The reflections from the discontinuities (which are in motion with respect to the sensor) produce a change in the reflected energy, better known as a doppler shift. Systems of this type depend upon a knowledge of the propagation velocity of the energy form used, measured in a motionless fluid. Hence, they are dependent upon the fluid's temperature, density, etc. Consequently, they require corrections similar to those required with a pitot-static head device.

Still other means are known for sensing the relative velocity between a fluid and a body immersed in the fluid. However, none of them have been entirely satisfactory in providing accurate relative velocity measurements. Therefore, it is an object of this invention to provide a new and improved method and apparatus for velocity sensing.

It is a further object of this invention to provide a velocity sensor that does not need to be calibrated for varying environmental conditions.

In many environments, such as on a high speed aircraft, for example, it is desirable to provide a digital indication of relative velocity. However, prior art systems provide analog indications of relative velocity. Hence, it is a still further object of this invention to provide a method of and apparatus for velocity sensing that provides a digital output directly related to the relative velocity between a fluid and an immersed body.

It is well known that a fluctuating flow field composed of vortices is present in the wake of a blunt object located in a relatively moving fluid. That is, if an object is passing through a fluid, or if a fluid is passing an object, a fluctuating flow field is developed which is composed of vortices which are alternately shed from the sides of the object. This fluctuating flow field is more commonly referred to as a Karman vortex street or trail. Studies of the nature of these fluctuations have been previously conducted and show that a number, known as the Strouhal number, accurately relates the various parameters in dimensionless form. This relationship is:

$$S = fd/V$$

where:
$S$ is the Strouhal number;
$f$ is the vortex shed frequency in cycles per second;
$d$ is the object width or diameter in feet; and
$V$ is the relative velocity between the body and the fluid stream in feet per second.

Various attempts have been made to measure the rate of generation of vortices in the wake of a body or object so as to provide a velocity sensor. However, these prior art devices have been generally unsatisfactory, most often due to the use of complex electromechanical systems. Therefore, it is still another object of this invention to provide a new and improved system for detecting a Karman vortex street.

It is yet another object of this invention to provide a method of and apparatus for sonic velocity sensing that operates on the principal of detecting Karman vortices and is relatively uncomplex.

SUMMARY OF THE INVENTION

In accordance with principles of this invention, the Karman vortex street generated in the wake of an object located in a fluid stream is sensed. In one embodiment, a vortex strut is mounted in the stream and sonic transducers are located on either side of the resulting wake. One sonic transducer is a trasmitting transducer and the other is a receiving transducer. The transmitting transducer transmits a sonic signal which is modulated by the Karman vortices and sensed by the receiving transducer. An electronic oscillator is connected to the transmitting transducer to create the desired sonic signal and an electronic detector is connected to the receiving transducer to sense the modulating signal.

In accordance with a further principle of this invention, the vortex strut may be replaced by a vortex ring. The transducers, in this embodiment, are mounted on either side of the ring. In this form, the sonic velocity sensor of the invention has omnidirectional characteristics.

In accordance with an alternate principle of this invention the transmitting and receiving transducer can be combined into a single transducer. The single transducer is mounted in the vortex strut and gated from one mode to another. The oscillator generates a burst signal which is transmitted via the transducer to a moving vortex. The vortex reflects the signal back to the transducer. The modulation frequency in this case, is the envelope of the received signals and is related to velocity in accordance with the foregoing formula.

It will be appreciated from the relationships set forth above, that since the Strouhal number is relatively independent of velocity, the vortex shed frequency or modulation frequency is directly proportional to relative velocity. Hence, by detecting the modulation frequency of the sonic signal, an indication of velocity is provided. In addition, because the Strouhal number is independent of the fluid characteristics, such as density and pressure, the resulting velocity signal is also relatively independent of fluid characteristics. Moreover, no complex doppler shift and sensing circuits are required. And, since the output from the receiving transducer is in frequency rather than analog form, it satisfies the desired requirement for a system that generates a digital output so that variations in amplification or drift will not effect the accuracy of the measurement. Hence, the invention overcomes the above discussed disadvantages of the prior art.

BRIEF DESCRIPTION OF THE DRAWINGS

The foregoing objects and many of the attendant advantages of this invention will become more readity appreciated as the same becomes better understood by reference to the following detailed description when taken in conjunction with the accompanying drawings, wherein:

FIG. 1 is a pictorial diagram illustrating the generation of Karmen vortices in the wake of an object located in a fluid stream;

FIG. 4 is a perspective view of a structure suitable for supporting the transducer elements of one embodiment of the invention;

DESCRIPTION OF THE PREFERRED EMBODIMENTS

FIG. 1 is a pictorial diagram illustrating the generation of a Karman vortex street or trail. An object 11 is located in a fluid stream 12. The object may be stationary in a moving stream; the object may be passing through a stationary fluid; or, both the object and the fluid stream may be moving. In any event, a plurality of vortices 13 are generated in the wake of the object and create a fluctuating flow field. The frequency of fluctuation is related to the relative velocity between the object and the fluid by the dimensionless Strouhal number set forth above.

The physics behind the generation of a Karman vortex street is well known. Hence, it will not be further discussed here. However, it will be appreciated from the foregoing brief description that measurement of the flow field fluctuation frequency in the wake of the object provides an indication of the relative velocity between the object and the fluid stream.

Figure 2A:
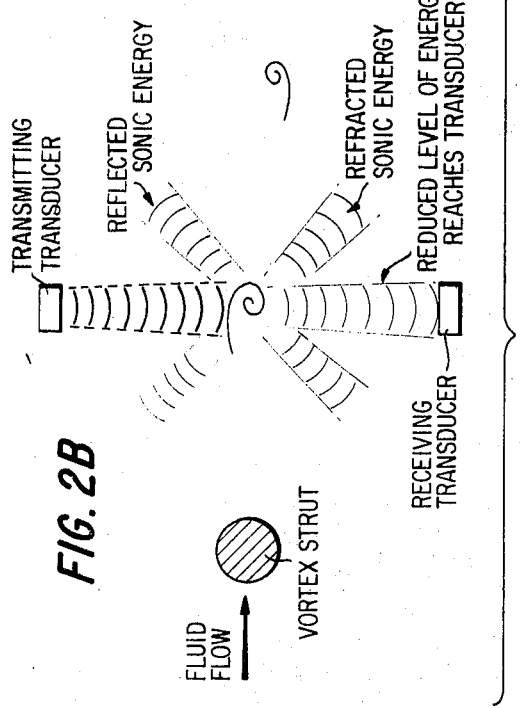
FIG. 2A and FIG. 2B illustrate the theory of operation of one form of the invention.
Figure 2B:
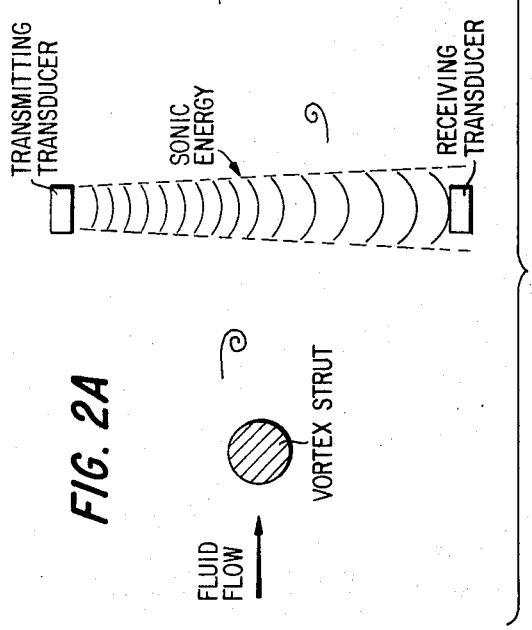

The basic concept of the invention is the detection of vortex movement by sonic means and depends upon the pressure differential and mass rotation within the vortices. As used herein, the term "sonic" means acoustic, ultra-sonic and sub-sonic waves, with ultrasonic waves being preferred. The pressure differential and mass rotation within a vortex causes an impinging sonic signal to be partially reflected and refracted as it passes through a vortex. Hence, if a directional sonic transducer is located on one side of the Karman vortex street and directs a sonic beam through the street, and a sonic receiving transducer is located on the other side of the Karman vortex street in the beam, less sonic energy will be received by the receiving transducer when a vortex is passing between transducers than when a vortex is not passing between the transducers. This type of system is illustrated in FIGS. 2A and 2B. FIG. 2A illustrates what occurs when a vortex is not crossing the path between the two transducers and FIG. 2B illustrates the reflection and refraction of sonic energy that occurs when a vortex is crossing the path between the two transducers.

Figure 3A:
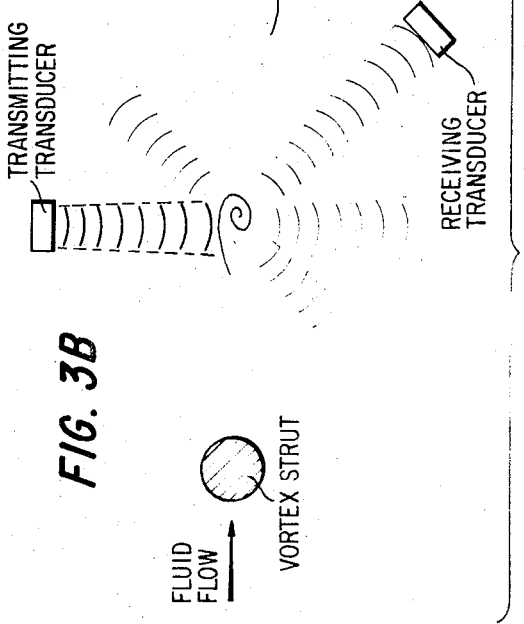
FIG. 3A and FIG. 3B illustrate the theory of operation of an alternate form of the invention.
Figure 3B:
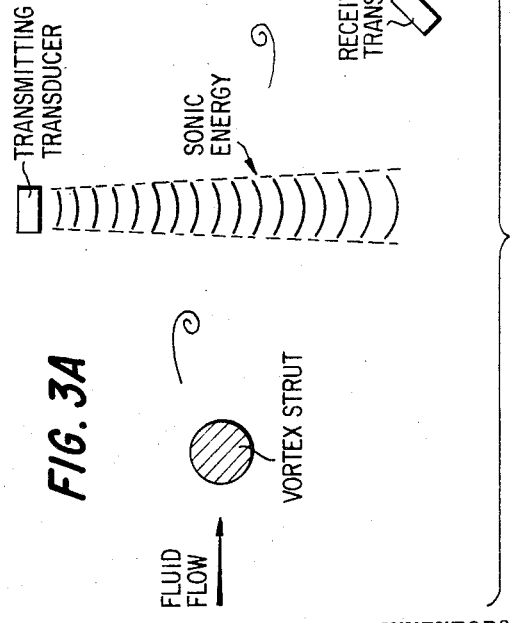

FIGS. 3A and 3B pictorially illustrate an alternative form of the invention wherein the receiving transducer is located outside of the beam transmitted by the transmitting transducer. In this embodiment, as illustrated in FIG. 3A, the absence of a vortex in the transmission path causes little or no energy to be received by the receiving transducer. Contrawise, as illustrated in FIG. 3B, when a vortex crosses the beam, energy is scattered in all directions by the vortex, some of which is received by the receiving transducer. Hence, the portion of the transmitted signal received in the FIGS. 2A and 2B embodiment is modulated by a decrease in energy when a vortex passes, while the portion of the transmitted signal received in the FIGS. 3A and 3B embodiment is modulated by an increase in energy.

FIG. 4 is a pictorial diagram of a structure formed in accordance with the invention for mounting sonic transducers in the wake of a vortex strut. The transmitting transducer is located on one side of the wake and the receiving transducer is located on the other side of the wake and in the beam of the transmitting transducer, hence, the FIG. 4 structure encompasses the method illustrated in FIGS. 2A and 2B.

The structure illustrated in FIG. 4 comprises a base 21 formed of a base plate 23, a strut 25 and a support plate 27. The base plate 23 supports the strut 25, which is, preferably, in the form of vertical air foil with respect to the base plate. The support plate 27 is located on top of the strut 25, parallel to the base plate. The base 21 can be formed of three separate components, however, it is preferably formed as a single unit. As illustrated in FIG. 4, the support plate projects outwardly above the strut in a manner somewhat similar to wings.

Projecting upwardly from the support plate 27 at the outer ends thereof are first and second transducer struts 29 and 31. The transducer struts include apertures 33 wherein suitable receiving and transmitting sonic transducers can be mounted, one in each strut. Located in the front of the axis 30 that intersects the apertures of the transducer struts 29 and 31 is a vortex strut 35. The vortex strut is illustrated as cylindrical in cross-section, however, it can take on any suitable form, such as oval, triangular or diamond, for examples.

Figure 5:
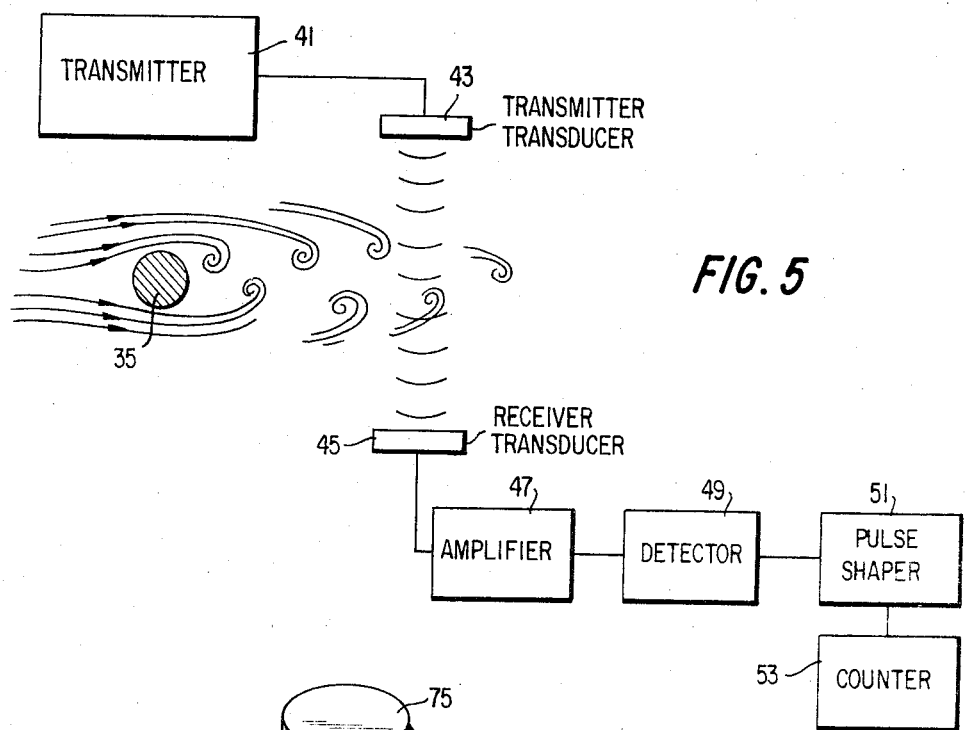
FIG. 5 is a partially schematic, partially pictorial diagram of electronics suitable for use with some of the embodiments of the invention.

FIG. 5 is a partially block, partially pictorial diagram illustrating an electronic system used in combination with transducers mounted in the manner illustrated in FIG. 4. FIG. 5 comprises: a transmitter 41; a transmitting transducer 43; a receiving transducer 45; an amplifier 47; a detector 49; a pulse shaper 51; and, a counter 53. As previously described with respect to FIG. 4, the transmitting transducer 43 is mounted on one side of the wake of the vortex strut 35; and the receiving transducer 45 is mounted on the other side of the wake of the vortex strut in the beam of the transmitting transducer.

The transmitter 41 generates a sonic signal and applies it to the transmitting transducer 43 via a suitable connecting wire. The sonic signal generated by the transmitting transducer 45 passes through the wake of the vortex strut 35 and is modulated by the fluctuating flow field formed in the wake of the strut by the generation of a Karman vortex street. The modulated sonic signal is received by the receiving transducer 45 and applied to the amplifier 47 via a suitable connecting wire. The amplified signal is, in turn, applied to the detector 49, which in essence is a demodulator that detects the modulation signal and generates pulses at the modulation frequency. The pulses are shaped by the pulse shaper 51 and applied to the counter 53 whose count is related to the relative velocity in accordance with the formula set forth above.

It will be appreciated by those skilled in the art that the electronic system illustrated in FIG. 5 is merely exemplary and may take on many different, specific forms. The transducer 41 may contain an oscillator whose signal is suitably amplified prior to application to the transmitting transducer 43. In addition, the amplifier 47 may include a suitable preamplifier. The detector 49 may be any one of various types. For example, the detector could be a synchronous demodulator operating at the frequency of oscillation of the transmitter oscillator. Moreover, the pulse output from the detector 49 may be applied to a digital-to-analog converter to obtain an analog output signal, if desired, so that the output signal can be directly applied to an analog indicating instrument. Alternatively, the output from the pulse shaper 51 can be applied to a digital meter rather than to a counter. Or, the output from the pulse shaper can be applied to a computer located onboard an aircraft where the computer controls certain aircraft operations which are dependent upon the velocity of the aircraft. Hence, the electronic sub-system can take on various configurations. In general, the fundamental requirement of the invention is a means for generating an acoustic signal and passing it through a vortex trail along with a means for receiving the modulated signal and interpreting it.

Figure 6:
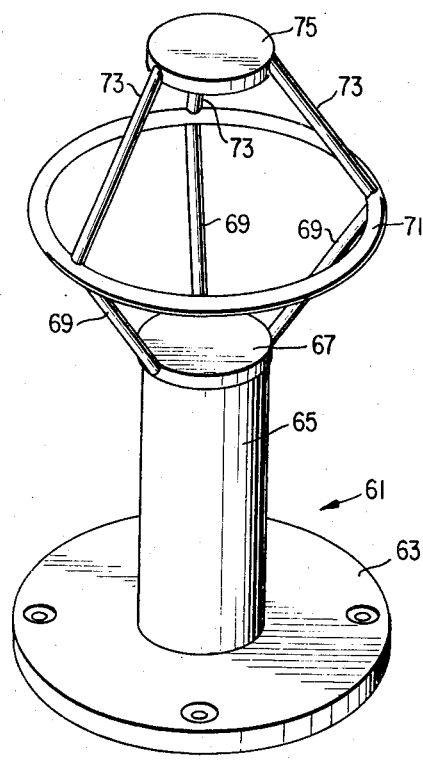
FIG. 6 is a perspective view of an alternate structure suitable for supporting the transducer elements of an embodiment of the invention.

FIG. 6 illustrates an alternate structure for supporting the transmitting and receiving transducers in the FIGS. 2A and 2B manner and is, essentially, omnidirectional. The structure illustrated in FIG. 6 comprises a base 61 formed of a cylindrical base plate 63 and a cylindrical upwardly extending support strut 65. A first transducer housing 67 is mounted atop the cylindrical support strut 65. Projecting upwardly, and outwardly are three support struts 69 that support a vortex ring 71. Projecting upwardly and inwardly from the vortex ring 71 are three more support struts 73. The second set of support struts 73 support a second transducer housing 75.

A transmitting transducer is held in one transducer housing and projects a sonic beam toward the other transducer housing. A receiving transducer is held in the other transducer housing. The transducers can be connected to an electronic system of the type illustrated in FIG. 5 so that the operation of the overall system is the same as previously described, the only difference being that the structure illustrated in FIG. 6 is essentially omnidirectional in one plane. That is, when there is relative movement in the plane defined by the vortex ring 71, vortices are created that pass through the transmitting tranducer's beam. These vortices modulate the transmitted sonic signal in the manner heretofor described and the modulated signal is detected by the receiver transducer.

It should be noted, that the structures illustrated in FIGS. 4 and 6 can be easily modified so that the invention operates in the manner illustrated and described with respect to FIGS. 3A and 3B. That is, by moving the receiving transducer out of the beam of the transmitting transducer by structurally modifying FIGS. 4 and 6, the invention will operate in the manner illustrated in FIGS. 3A and 3B and heretofor described.

Figure 7:
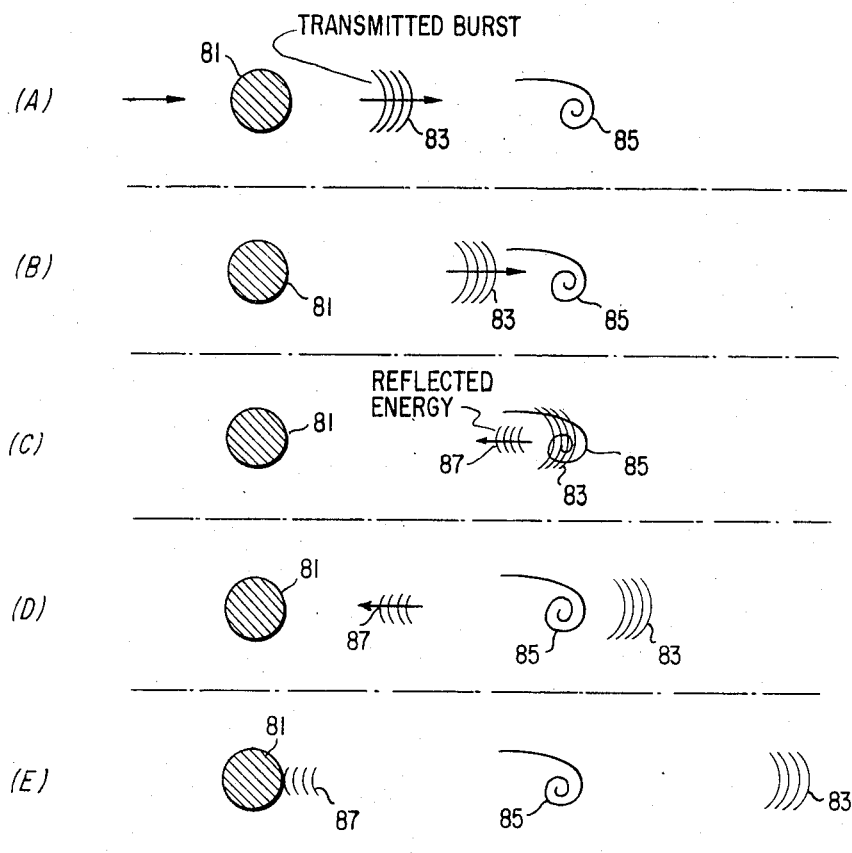
FIG. 7 A–E is a sequence pictorial diagram illustrating the theory of operation of a further form of the invention.

It follows from the previous description of the operation of the embodiment of the invention illustrated pictorially in FIGS. 3A and 3B that the receiving transducer can be located coincident with the transmitting transducer because when the sonic signal is scattered by the vortex, some energy is reflected directly back to the transmitting transducer. Consequently, a single transducer that is alternately used for transmitting and receiving can be utilized by the invention. In fact, the transmitting and receiving transducer can be mounted in the vortex strut. The sequence of operation of an embodiment of the invention formed in accordance with this theory is illustrated in FIG. 7 A–E. More specifically, region A of FIG. 7 illustrates a vortex strut 81 having mounted therein a single transducer. At this point the time sequence(region A), the transmitting transducer has just transmitted a burst signal 83 which is moving toward a vortex 85. Region B illustrates the point in time where the burst signal 83 has just reached the vortex 85. Region C illustrates the point in the sequence when the burst signal 83 is passing through the vortex 85 and a reflected energy signal 87 is generated. Region D illustrates the reflected energy signal 87 approaching the strut 81. And, region E illustrates the reflected energy signal 87 just reaching the transducer strut 81.

Figure 8:
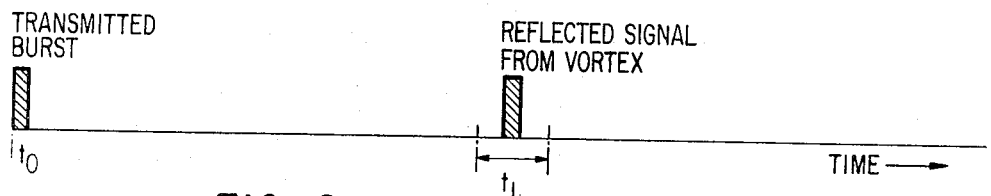
FIG. 8 is a timing diagram utilized to describe the operation of one form of the invention.

Since, in the presence of any fluid flow, several vortices are always present at any point in time, energy is continuously reflected from some vortex back to the transducer. While velocity, perhaps could be measured by observing the doppler shift in the reflected signal which is caused by the relative motion between the transducer and the reflecting vortex, such a system would be rather complicated. Therefore, the invention uses a significantly different system. The electronic system used by the invention does not look at the doppler shift, rather it counts or detects the passage of the vortex as it reaches a certain point downstream of the transducer. More specifically, the invention utilizes the "range gating" technique well known in radar and sonar systems, whereby, the transducer first transmits a short burst of energy and at some later time the receiver is turned on for a short period of time to see if any reflected energy is present. That is, by turning on a receiver at time E in FIG. 7, a reflected energy signal is detected or sensed. This point in time is illustrated in FIG. 8. More specifically, assuming that the receiver is turned on at time t, and that the reflected signal from the vortex occurs at this period of time, a received signal is sensed by the receiver. It will be appreciated by those skilled in the art that $t=2d/c$; where: $c$ is the velocity of the sonic signal and $d$ is the distance from the vortex to the transducer.

Figure 9:
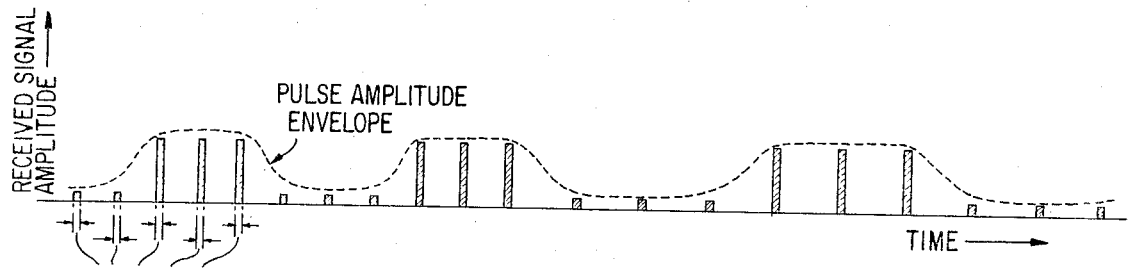
FIG. 9 is a waveform diagram utilized to describe the operation of one form of the invention.

FIG. 9 is a diagram illustrating the envelope of a series of bursts received by a receiver. It will be appreciated from viewing FIG. 9 that the invention operates on the theory of only accepting a reflected energy burst when a vortex is located at a predetermined distance from the transducer and only looks for the presence or absence of a signal at this period of time. Hence, if the receiver output is viewed over a long period of time while transmitting sufficiently rapid bursts of sonic energy to avoid missing any vortices, a pulse train of the type illustrated in FIG. 9 is received. The envelope of the received pulses indicates the passage of the vortices past the selected point from the transducer. By counting the "modulation" or envelope frequency, relative velocity is obtained in exactly the same manner as obtained with the previously described embodiments of the invention.

The major difference between the various embodiments of the invention is that the signal amplitude of the signal received in the FIG. 2A and 2B type embodiments is reduced by the occurrence of a vortex whereas the signal amplitude in the FIG. 3A and 3B, and FIG. 7 type embodiments is increased. It should be noted that the vortices in the FIG. 7 type embodiment are existing only in one direction from the transducer, hence, the radiation from the transducer does not need to be, nor should it be, directional. If it is omnidirectional, the overall system is an omnidirectional velocity sensor.

Figure 10:
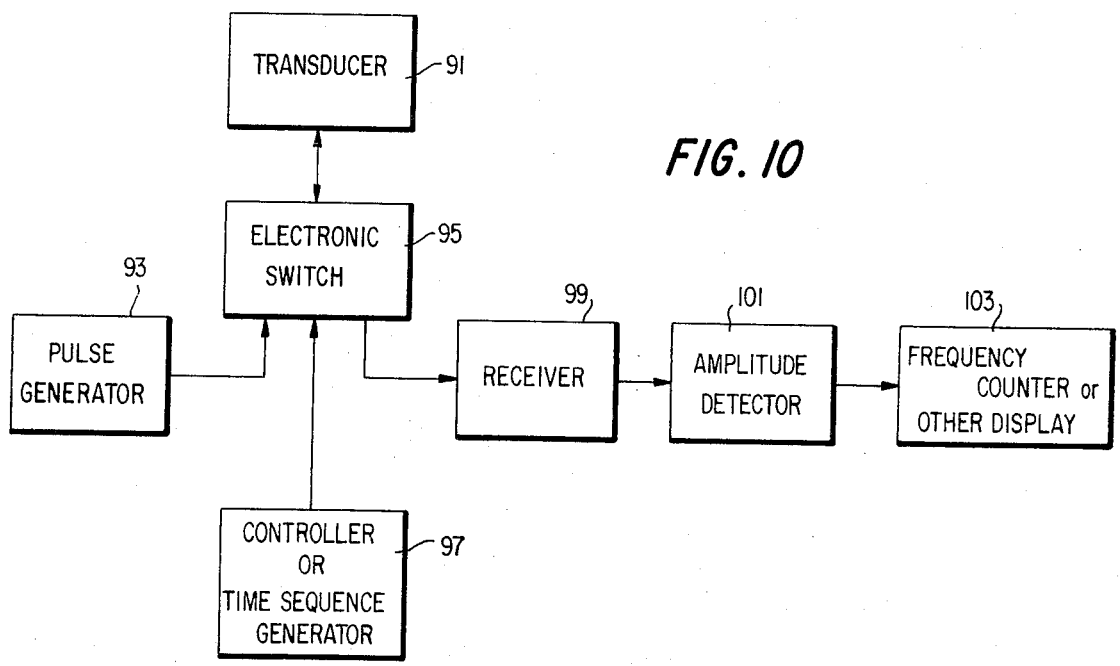
FIG. 10 is a block diagram illustrating an electronic system suitable for use with an embodiment of the invention; and, FIG. 11 is a perspective view of a structure suitable for supporting the transducer element of an embodiment of the invention.

FIG. 10 illustrates an electronic subsystem suitable for use with a single transducer embodiment of the invention, and comprises: a transducer 91; a pulse generator 93; an electronic switch 95; a controller or time sequence generator 97; a receiver 99; an amplitude detector 101; and, a frequency counter or other display 103. The transducer 91 is a sonic transducer that can transmit or receive sonic signals. The input/output of the transducer is connected to the input/output of the electronic switch 95. The output of the pulse generator 93 is connected to one input of the electronic switch 95 and the input of the receiver 99 is connected to an output of the electronic switch 95. The controller or time sequence 97 is connected to the control input of the electronic switch 95. The controller or time sequence generator 97 controls whether a signal from the pulse generator 93 is to be applied to the transducer 91 or whether a signal received by the transducer 91 is to be applied to the receiver 99 during a particular period of time.

The output from the receiver 99 is connected to the amplitude detector 101 which detects the envelope of the pulses received by the receiver 99. The output from the amplitude detector which is a frequency signal related to the relative velocity between the transducer strut and the fluid stream is applied to the frequency counter 103.

Figure 11:
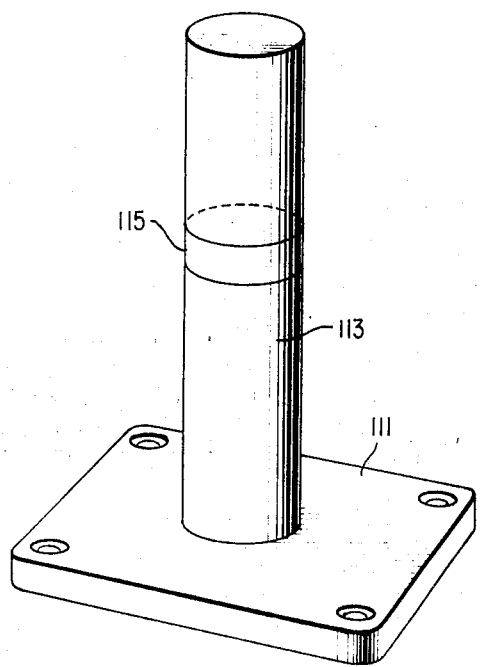

FIG. 11 illustrates a structure for supporting the composite receiving and transmitting transducer and comprises a base plate 111 having an upwardly projecting vortex strut 113. The transducer is mounted in the approximate center of the vortex strut so as to prevent the edges of the strut from having an undesirable effect.

It will be appreciated from the foregoing description that the invention provides a rather uncomplicated system for generating an indication related to the relative velocity of movement of a body through a fluid stream. Since the output of various embodiments is in frequency form, rather than analog form, it is digital in nature. Hence, variations in amplification and drift of the electronic subsystems do not effect measurement accuracy. Resolution of velocity, of course, depends upon the ability to sense small flow fluctuations from the normal flow field. However, the correct placement of the transducers with respect to the vortex strut in the plural transducer embodiments increases the resolution of the overall instrument. The preferred point is at the vortex break-point. It has been found that a one half inch cylindrical vortex strut generates a frequency of approximately 4.8 cycles per second/feet per second when the strut is suspended normal to the direction of fluid flow. Therefore, relative velocities from 1 to 5 knots produce sensor output frequencies of about 8 to 40 cycles per second. This frequency range can, of course, be modified by varying the width of the vortex strut.

It will be appreciated from the forgoing description that because a direct relationship between a frequency output signal and the relative velocity exists and because the frequency signal is digital in nature, the output can be directly applied to a digital measuring device without going through an analog-to-digital conversion. Moreover, the instrument is both less complex than those of the prior art and more accurate. In addition, it is not affected by ambient temperature or density of fluid. Hence, the invention can be utilized in varying environments such as on high speed aircraft that travel at low and high altitudes where pressure variations occur over a wide range. The invention can also be used in other fluids, such as water, oxygen, etc.

It will also be appreciated that the foregoing description merely describes a preferred embodiment of the invention and that the invention can take on various similar forms. For example, the structure illustrated in FIG. 4 can be mounted in a cylinder located in a fluid stream so as to prevent side or transverse fluid motion from affecting the operation of the system. Moreover, the vortex struct can be triangular in cross-section as opposed to the illustrated cylindrical shape. Hence, the invention can be practiced otherwise than as specifically described herein.

The embodiments of the invention in which an exclusive property or privilege is claimed are defined as follows:

1. A method of determining the relative velocity between a fluid stream and an object immersed in the fluid stream comprising the steps of:
   locating a vortex strut in the fluid stream so that Karman vortices are formed in the wake of the strut;
   generating a sonic signal;
   directing the sonic signal toward the vortices formed in the wake of the vortex strut so that the vortices modulate the sonic signal;
   receiving the modulated sonic signal; and,
   detecting the modulating frequency of the received sonic signal.

2. A method of determining the relative velocity between a fluid stream and an object immersed in the fluid stream as claimed in claim 1 wherein the sonic signal is directed from one side of the wake and is received on the other side of the wake.

3. A method of determining the relative velocity between a fluid stream and an object immersed in the fluid stream as claimed in claim 2 wherein the strut is located, and the signal is directed and received, in a manner such that the received sonic signal is modulated by a decrease in energy when it impinges on a vortex.

4. A method of determining the relative velocity between a fluid stream and an object immersed in the fluid stream as claimed in claim 2 wherein the strut is located, and the signal is directed and received, in a manner such that the received sonic signal is modulated by an increase in energy when it impinges on a vortex.

5. A method of determining the relative velocity between a fluid stream and an object immersed in the fluid stream as claimed in claim 1 wherein the sonic signal is directed from the vortex strut and is received at the vortex strut; and, including the additional step of gating the generating and receiving of the sonic signal so that the passage of vortices passed a predetermined point from the vortex strut is detected.

6. A sonic velocity sensor comprising:
   a vortex strut mounted so that Karman vortices are created in the wake of the strut when there is relative movement between the strut and a fluid in which the strut is immersed;
   sonic signal generating means, including a sonic transmitting transducer, for generating and transmitting a sonic signal;
   sonic signal receiving means for receiving a sonic signal, said sonic signal receiving means including a sonic receiving transducer suitable for detecting a modulated sonic signal; and,
   support means for supporting said sonic transmitting transducer and said sonic receiving transducer so that the signal generated by said sonic signal generating means impinges on the vortices formed in the wake of said vortex strut and the sonic signal received by said sonic signal receiving means is modulated by said vortices prior to being received.

7. A sonic velocity sensor as claimed in claim 6 wherein said support means supports said sonic transmitting transducer on one side of the vortices formed in the wake of said vortex strut and supports said sonic receiving transducer on the other side of the wake.

8. A sonic velocity sensor as claimed in claim 7 wherein said sonic signal receiving means includes a detector connected to said sonic receiving transducer for detecting the modulation frequency of the received sonic signal; and, wherein said sonic signal receiving means also includes a digital counter connected to said detector for counting the modulation frequency of the signal detected by said detector.

9. A sonic velocity sensor as claimed in claim 7 wherein said receiving transducer is supported so as to lie in the sonic beam transmitted by said sonic transmitting transducer.

10. A sonic velocity sensor as claimed in claim 9 wherein said sonic signal receiving means includes a detector connected to said sonic receiving transducer for detecting the modulation frequency of the received sonic signal; and, wherein said sonic signal receiving means also includes a digital counter connected to said detector for counting the modulation frequency of the signal detected by said detector.

11. A sonic velocity sensor as claimed in claim 6 wherein said sonic transmitting transducer and said sonic receiving transducer are formed as a unitary transducer; and, including gating means for gating said unitary transducer from a transmitting mode to a receiving mode.

12. A sonic velocity sensor as claimed in claim 11 wherein said unitary transducer is supported in said vortex strut.

13. A sonic velocity sensor as claimed in claim 12 wherein said sonic signal receiving means includes a detector connected to said sonic receiving transducer for detecting the modulation frequency of the received sonic signal; and, wherein said sonic signal receiving means also includes a digital counter connected to said detector for counting the modulation frequency of the signal detected by said detector.

14. A sonic velocity sensor comprising:
   a vortex ring mounted so that Karman vortices are created in the wake of the ring when there is relative movement between the ring and a fluid in which the ring is immersed;
   sonic signal generating means, including a sonic transmitting transducer, for generating and transmitting a sonic signal;
   sonic signal receiving means for receiving a sonic signal, said sonic signal receiving means including a sonic receiving transducer suitable for detecting a modulated sonic signal; and,
   support means for supporting said sonic transmitting transducer and said sonic receiving transducer so that the signal generated by said sonic signal generating means impinges on the vortices formed in the wake of said vortex strut and the sonic signal received by said sonic signal receiving means is modulated by said vortices prior to being received.

15. A sonic velocity sensor as claimed in claim 14 wherein said support means supports said sonic transmitting transducer on one side of the vortices formed in the wake of said vortex strut and supports said sonic receiving transducer on the other side of the wake.

16. A sonic velocity sensor as claimed in claim 15 wherein said sonic signal receiving means includes a detector connected to said sonic receiving transducer for detecting the modulation frequency of the received sonic signal; and, wherein said sonic signal receiving means also includes a digital counter connected to said detector, for counting the modulation frequency of the signal detected by said detector.

17. A sonic velocity sensor as claimed in claim 15 wherein said receiving transducer is supported so as to lie in the sonic beam transmitted by said sonic transmitting transducer.

18. A sonic velocity sensor as claimed in claim 17 wherein said sonic signal receiving means includes a detector connected to said sonic receiving transducer for detecting the modulation frequency of the received sonic signal; and, wherein said sonic signal receiving means also includes a digital counter connected to said detector for counting the modulation frequency of the signal detected by said detector.

19. A sonic velocity sensor comprising:
- a vortex strut mounted so that Karman vortices are created in the wake of the strut when there is relative movement between the strut and a fluid in which the strut is immersed;
- sonic signal generating means for generating a sonic signal;
- sonic signal receiving means for receiving a sonic signal; and,
- a sonic transducer mounted in said vortex strut and connected to said sonic signal generating means and to said sonic signal receiving means for transmitting a sonic signal and detecting a modulated sonic signal.

20. A sonic velocity sensor as claimed in claim 19 including gating means connected to said sonic transducer for gating said sonic transducer from a transmitting mode to a receiving mode.

21. A sonic velocity sensor as claimed in claim 20 wherein:
- said sonic signal generating means comprises a pulse generator;
- said sonic signal receiving means comprises a receiver for receiving sonic signals, an amplitude detector connected to said receiver for detecting signals above a predetermined magnitude, and a counter connected to said amplitude detector for counting the signals detected by said amplitude detector; and,
- said gating means comprises an electronic switch connected to said pulse generator, said receiver and said sonic transducer, and a controller connected to said electronic switch to control the operation of said electronic switch.

22. A method of obtaining information about the relative flow of fluid comprising the steps of:
- creating a disturbance in said fluid by inserting a strut into said fluid;
- transmitting a sonic signal toward said disturbance so that said disturbance modulates said sonic signal;
- receiving said modulated sonic signal; and,
- detecting the modulation frequency of said received sonic signal.

23. The method of claim 22 wherein said sonic signal is transmitted toward said disturbance from one location and said modulated sonic signal is received at a different location.

24. The method of claim 22 wherein said transmitted sonic signal and said received modulated sonic signal are transmitted from and received at the same location.

25. An apparatus for obtaining information about the relative flow of fluid comprising:
- a strut mounted so as to be inserted into said fluid thereby creating a disturbance in said fluid;
- sonic signal transmitting means for transmitting a sonic signal toward said disturbance so that said disturbance modulates said sonic signal;
- sonic signal receiving means for receiving a sonic signal, said sonic signal receiving means mounted so as to receive said modulated sonic signal; and,
- detecting means connected to said receiving means for detecting the modulation frequency of said received modulated sonic signal.

26. The apparatus of claim 25 wherein said transmitting means is mounted at one location and said receiving means is mounted at another location.

27. The apparatus of claim 25 wherein said transmitting means and said receiving means are mounted at the same location.

28. A sonic velocity sensor comprising:
- a vortex strut mounted so that Karman vortices are created in the wake of the strut when there is relative movement between the strut and a fluid in which the strut is immersed;
- sonic signal generating means, including a sonic transmitting transducer, for generating and transmitting a sonic signal;
- sonic signal receiving means for receiving a sonic signal, said sonic signal receiving means including a sonic receiving transducer suitable for receiving a modulated sonic signal and a detecting means coupled to said sonic receiving transducer for detecting the modulations of said received sonic signal; and,
- support means for supporting said sonic transmitting transducer and said sonic receiving transducer so that the signal generated by said sonic signal generating means impinges on the vortices formed in the wake of said vortex strut and the sonic signal received by said sonic signal receiving means is modulated by said vortices prior to being received.

* * * * *